United States Patent
Wang

(10) Patent No.: US 11,548,591 B2
(45) Date of Patent: Jan. 10, 2023

(54) SPROCKET AND CHAIN ASSEMBLY FOR BICYCLE

(71) Applicant: HUANG CHIEH METAL COMPOSITE MATERIAL TECH. CO., LTD., New Taipei (TW)

(72) Inventor: Chin-Han Wang, New Taipei (TW)

(73) Assignee: HUANG CHIEH METAL COMPOSITE MATERIAL TECH. CO., LT, New Taipei (TW)

( * ) Notice: Subject to any disclaimer, the term of this patent is extended or adjusted under 35 U.S.C. 154(b) by 237 days.

(21) Appl. No.: 17/111,446

(22) Filed: Dec. 3, 2020

(65) Prior Publication Data

US 2022/0177073 A1 Jun. 9, 2022

(51) Int. Cl.
- *B62M 9/00* (2006.01)
- *F16G 13/00* (2006.01)
- *F16H 55/30* (2006.01)

(52) U.S. Cl.
CPC ............ *B62M 9/00* (2013.01); *F16G 13/00* (2013.01); *F16H 55/30* (2013.01)

(58) Field of Classification Search
CPC .......... B62M 9/00; F16G 13/00; F16H 55/30; F16H 2055/185
USPC ................................. 474/152, 155
See application file for complete search history.

(56) References Cited

U.S. PATENT DOCUMENTS

| 4,747,261 A * | 5/1988 | Frenker-Hackfort ... F16G 13/18 59/5 |
| 2015/0362057 A1* | 12/2015 | Wesling ................. F16H 55/30 474/152 |
| 2018/0180159 A1* | 6/2018 | Tu ............................ B62M 9/00 |

FOREIGN PATENT DOCUMENTS

CN 214451628 U * 10/2021

* cited by examiner

*Primary Examiner* — Gene O Crawford
*Assistant Examiner* — Emily R Kincaid
(74) *Attorney, Agent, or Firm* — Chun-Ming Shih; Lanway IPR Services

(57) ABSTRACT

A sprocket and chain assembly for bicycles is revealed. The sprocket and chain assembly for bicycles includes a bicycle sprocket and a bicycle chain. A contact part of the bicycle sprocket and a contact part of the bicycle chain in contact with each other are made of a multi-layer clad metal which is composed of a first metal and a second metal. The first metal has higher hardness and density than the second metal. A surface material for the contact parts of the bicycle sprocket and the bicycle chain is the first metal for providing sufficient wear resistance and ensuring service life of both the bicycle sprocket and the bicycle chain. Moreover, the lightweight design of the bicycle sprocket and the bicycle chain is achieved and sufficient structural strength is provided by the contact parts made of the multi-layer clad metal.

11 Claims, 5 Drawing Sheets

SPROCKET AND CHAIN ASSEMBLY FOR BICYCLE

BACKGROUND OF THE INVENTION

Technical Field

The present invention relates to bicycle, especially to a sprocket and chain assembly for bicycles which has advantages of wear resistance, lightweight design and sufficient structural strength.

Description of Related Art

A sprocket (or chainwheel) and a chain are main transmission parts for bicycles. The sprocket includes a front sprocket assembly disposed on a chainring (chainwheel) and a rear sprocket assembly arranged at a flywheel on a rear hub of the bicycle. A chain connects the front sprocket assembly and the rear sprocket assembly and the rotating front sprocket assembly transfers power to the rear wheel via the chain and the rear sprocket assembly. In the transmission mechanism of certain multispeed bicycles, the front sprocket assembly includes at least one sprocket with different numbers of teeth and the rear sprocket assembly includes a plurality of coaxial rear sprockets with different numbers of teeth. The chain is pushed and shifted to different front sprockets and/or rear sprockets by a derailleur system. During the movement, the chain and the teeth of the sprockets are constantly in contact with each other and worn out. Thus how to reduce wear on the chain and the sprockets and noises resulting from engagement between the chain and the sprockets has become one of the most important issues to be addressed in the bicycle industry.

The technique available now for reduction of noises from the sprockets and the chain is through redesign of structure or shape of links of the chain. For example, an outer plate of a bicycle chain is revealed in Chinese Utility Model Publishing number CN2504436Y. The outer plate features on specific shapes on inner and outer surfaces of an intermediate portion thereof. Also refer to Chinese Utility Model Publishing number CN202140504U, a chain and an outer plate thereof are disclosed. Each of two ends of the outer plate is pointing inward to form a concave portion (a reentrant angle). When the chain is engaged with the sprocket for changing speed, the teeth of the sprocket can abut against the concave portions for facilitating the movement of the chain and allowing the speed change smoother. Refer to Chinese Utility Model Publishing number CN2168987Y, a bicycle chain is revealed. Without changing the chain pitch, space for allowing engagement between the chain and the teeth peak is increased and the chain is brought to the proper position for engagement by arrangement of tooth guide surfaces. Thereby the operation is smooth and the chance of a chain drop is reduced. Moreover, the disposition of protruding portions minimizes a gap and friction area therebetween after engagement of the chain with the sprocket for reducing noises caused by collisions or friction between the chain and the teeth peak during the operation.

Refer to Chinese Patent Pub. No. CN1263169A, a low-carbon microalloyed steel and a method for producing chain plate by using the same are revealed. A low-carbon microalloyed steel with simple process, low cost and high strength and a method for producing chain plates by using the same are provided. Refer to Chinese Patent Pub. No. CN101121956A, a thermal processing method for manufacturing link plates of bicycle chains by using plain carbon steel Q235 is revealed. The inventor claimed that tensile strength of the bicycle chain composed of the bicycles link plates made of Q235 processed by the method revealed not only meets the requirements of current national standards but also satisfies customer's needs after being tested and approved. According to the current market price, about 400 dollars are saved per ton of steel.

Although the chain and sprockets for bicycles generally made of steel have sufficient strength and wear resistance, the target of lightweight design is difficult to achieve by the parts made of steel.

SUMMARY OF THE INVENTION

Therefore it is a primary object of the present invention to provide a sprocket and chain assembly for bicycles with wear resistance and lightweight design.

In order to achieve the above object, a sprocket and chain assembly for bicycles according to the present invention includes a bicycle sprocket with teeth and a bicycle chain composed of a plurality of links joined to one another. Each of the links consists of two inner plates, two outer plates, two pins, and two bushings. A contact part of the bicycle sprocket is in contact with a contact part of the outer plate and a contact part of the inner plate and these contacts parts are made of a multi-layer clad metal which is composed of a first metal and a second metal. The hardness of the first metal is higher than that of the second metal and the first metal has a higher density than the second metal. A surface material for the contact parts of the bicycle sprocket, the outer plate, and the inner plate in contact with each other is the first metal with higher hardness.

The first metal is stainless steel and the second metal is aluminum alloy.

The first metal is 301 stainless steel and the second metal is 7075 aluminum alloy.

Preferably, the bicycle sprocket is made of the multi-layer clad metal having three layers. Two outer layers of the multi-layer clad metal are made of the second metal while an intermediate layer of the multi-layer clad metal is made of the first metal and exposed on front and rear sides of the tooth of the bicycle sprocket for being able to be in contact with the bushings of the link.

Preferably, the bicycle sprocket 10 is made of the multi-layer clad metal having five layers in which odd-numbered layers, including a first layer, a third layer and a fifth layer (the outermost layers and the intermediate layer), are made of the second metal while even-numbered layers, including a second layer and a fourth layer, are made of the first metal. Both inner and outer sides of the tooth of the bicycle sprocket are provided with a beveled edge while the even-numbered layers made of the first metal are exposed at the beveled edge and able to be in contact with the inner plates and the outer plates. The even-numbered layers made of the first metal are also exposed at the front and rear sides of the tooth of the bicycle sprocket and able to be in contact with the bushings of the link.

Preferably, the inner plates and the outer plates are produced by the multi-layer clad metal with two layers. One of the two layers is made of the first metal while the other layer is made of the second metal. The inner surface of both the inner plates and the outer plates is made of the first metal with higher hardness.

Preferably, the inner plates and the outer plates are made of the multi-layer clad metal with at least three layers and the number of the layers is odd. The odd-numbered layers of the multi-layer clad metal are made of the first metal while the even-numbered layers of the multi-layer clad metal are made of the first metal.

The advantages and functions of the present invention are in that surface material for the contact parts of the bicycle sprocket and the bicycle chain is the first metal with higher hardness so that sufficient wear resistance is provided and service life of both the bicycle sprocket and the bicycle chain is assured. Moreover, the contact parts of the bicycle sprocket and the bicycle chain in contact with each other are made of the multi-layer clad metal composed of the first metal and the second metal. Thus not only the weight of both the bicycle sprocket and the bicycle chain is dramatically reduced, sufficient structural strength is also provided.

The following are embodiments of the present invention showing advantages and functions with reference to figures and detailed descriptions.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

The following descriptions related to positions, including upper, lower, left, right, etc. are generally based on directions of the components shown in figures without specifically describing them.

Figure 1:
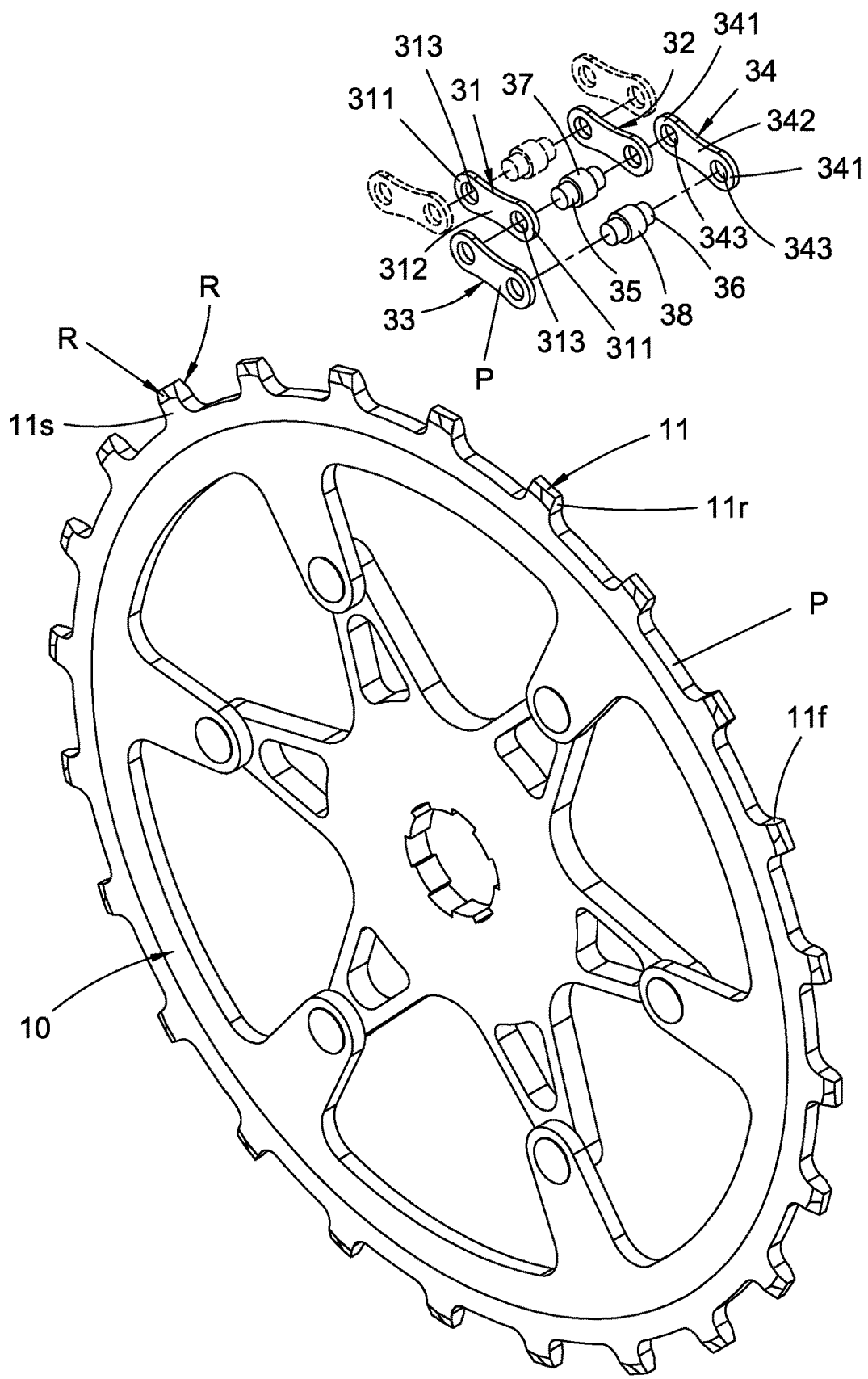
FIG. 1 is a schematic drawing showing a bicycle sprocket and an explosive view of a bicycle chain of an embodiment according to the present invention.

Refer to FIG. 1, a sprocket and chain assembly for bicycles according to the present invention includes a bicycle sprocket 10 with a plurality of teeth 11 and a bicycle chain 20 formed by a plurality of links 30 joined to one another. Each of the links 30 consists of two inner plates 31, 32, two outer plates 33, 34, two pins 35, 36 and two bushings 37, 38. The two bushings 37, 38 are rotatably fit around the two pins 35, 36 correspondingly so that the bicycle chain 20 and the teeth 11 of the bicycle sprocket 10 are in rolling contact and the wear of the bicycle chain 20 is minimized.

The two inner plates 31, 32 have the same structure. Take the inner plate 31 as an example. The inner plate 31 consists of two end parts 311, a bridge part 312 that connects the two end parts 311, and two inner pin holes 313 penetrating the inner plate 31 and located on the two end parts 311 respectively.

The two outer plates 33, 34 have the same structure. Take the outer plate 34 as an example. The outer plate 34 is composed of two end parts 341, a bridge part 342 that connects the two end parts 341, and two outer pin holes 343 penetrating the outer plate 34 and located on the two end parts 341 respectively.

The two outer plates 33, 34 are arranged outside the two inner plates 31, 32 respectively. One of the pins 35 is inserted through the outer pin hole 343 of one of the outer plates 33, the inner pin hole 313 of one of the inner plates 31, one of the bushings 37, the inner pin hole 313 of the other inner plate 32, and the outer pin hole 343 of the other outer plate 34 in turn so that the two outer plates 33, 34 and the two inner plates 31, 32 are pivotally connected while the two bushings 37, 38 are arranged between the inner plates 31, 32 and able to rotate freely.

The other pin 36 is pivotally connected to another link 30 with the same structure in the same way to join together. Thereby the links 30 having the same structure are joined from end to end to form a closed ring-shaped bicycle chain 20.

Figure 2:
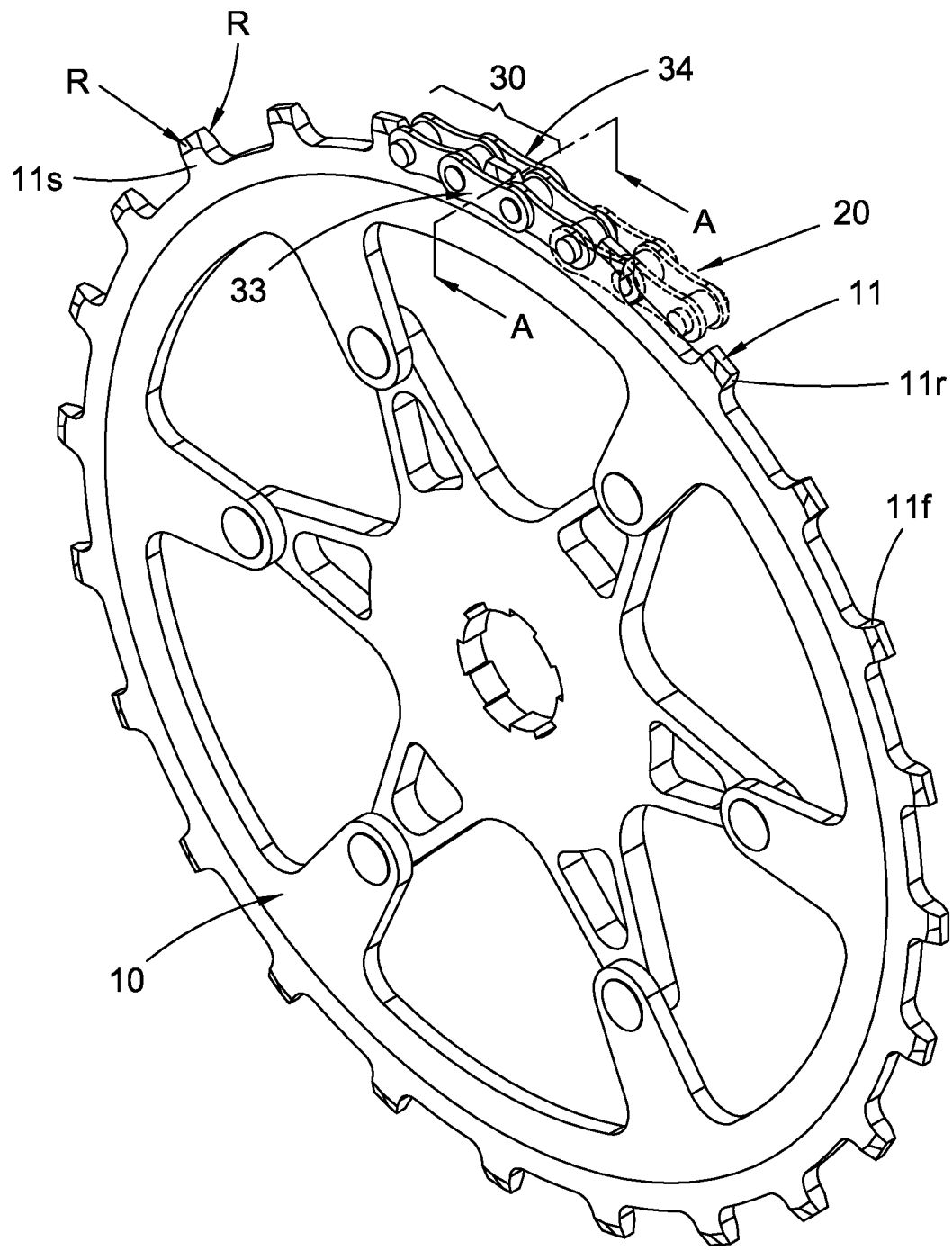
FIG. 2 is a partial perspective view of a bicycle sprocket engaged with some links of a bicycle chain of an embodiment according to the present invention.
Figure 3:
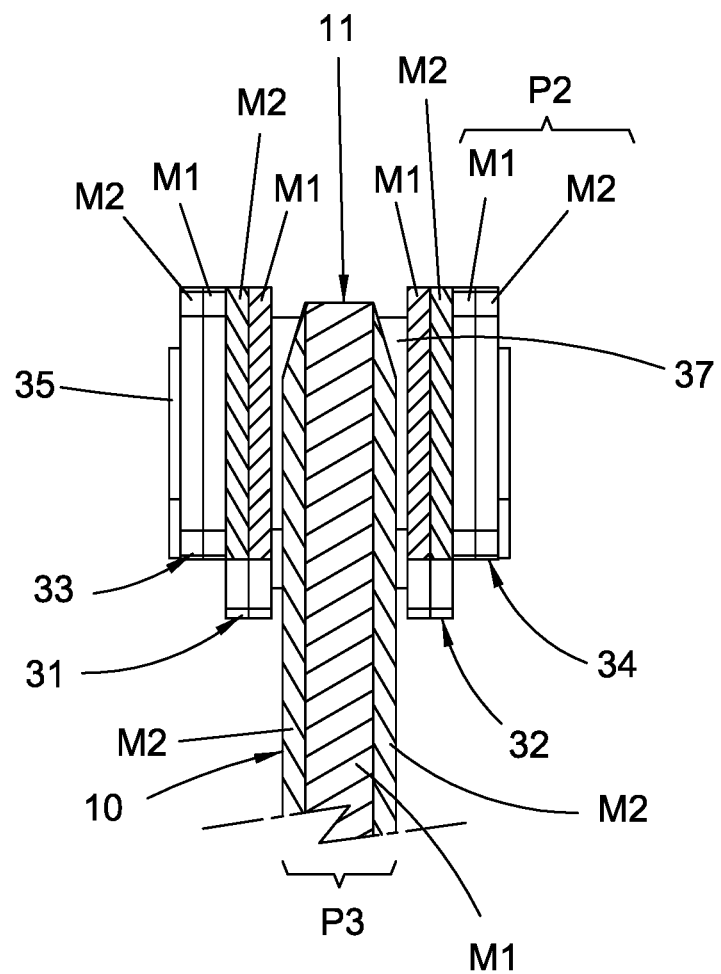
FIG. 3 is a sectional view taken along line A-A in FIG. 2 according to the present invention.

The bicycle sprocket 10 shown in FIG. 1 takes a bicycle chainwheel as an example, but not limited, it can also be a rear sprocket. The bicycle sprocket 10 is basically a round or ring-like component with a plurality of teeth 11 therearound. The tooth 11 is not only mounted into a space between the two bushings 37, 38 of the respective links 30 of the bicycle chain 20 but also mounted into a space between the two outer plates 33, 34 (as shown in FIG. 2) as well as a space between the two inner plates 31, 32 (as shown in FIG. 3). And the tooth 11 is inevitably in contact with inner surfaces of the two outer plates 33, 34 or the two inner plates 31, 32.

Compared with sprockets and chains for bicycles available now, the bicycle sprocket 10 and the bicycle chain 20 of the present invention basically have similar shapes and the same components. The present bicycle sprocket 10 and the bicycle chain 20 feature on that a contact part of the bicycle sprocket 10 and a contact part of the bicycle chain 20 in contact with each other are made of a multi-layer clad metal P which is composed of a first metal M1 and a second metal M2. The hardness of the first metal M1 is higher than that of the second metal M2 and the first metal M1 has a higher density than the second metal M2. In other words, the second metal M2 is lighter than the first metal M1. A surface material for the contact parts of the bicycle sprocket 10 and the bicycle chain 20 is the first metal M1 with higher hardness.

A method for manufacturing the multi-layer clad metal P includes the following steps. First a metal sheet made of the first metal M1 and a metal sheet made of the second metal M2 are bonded together by use of a rolling process to form the multi-layer clad metal P. Then the multi-layer clad metal P is treated by a machining process to produce the bicycle sprocket 10, the inner plates 31, 32, and the outer plates 33, 34. A contact part of the bicycle sprocket 10 is in contact with contact parts of the inner plates 31, 32 and contact parts of the outer plates 33, 34 while a surface material for the contact parts of the bicycle sprocket 10, the inner plates 31, 32, and the outer plates 33, 34 in contact with each other is the first metal M1. In a preferred embodiment, the first metal M1 is 301 stainless steel and the second metal M2 is 7075 aluminum alloy. Thus not only the weight of the bicycle sprocket 10 and the bicycle chain 20 is significantly reduced, sufficient strength is also obtained.

Refer to FIG. 3, the bicycle sprocket 10 is made of the multi-layer clad metal having three layers P3 in this embodiment. For convenient description and better differentiation, the number after P represents the amount of the layers included in the multi-layer clad metal P. For example, the multi-layer clad metal having three layers is labeled as P3.

Figure 5:
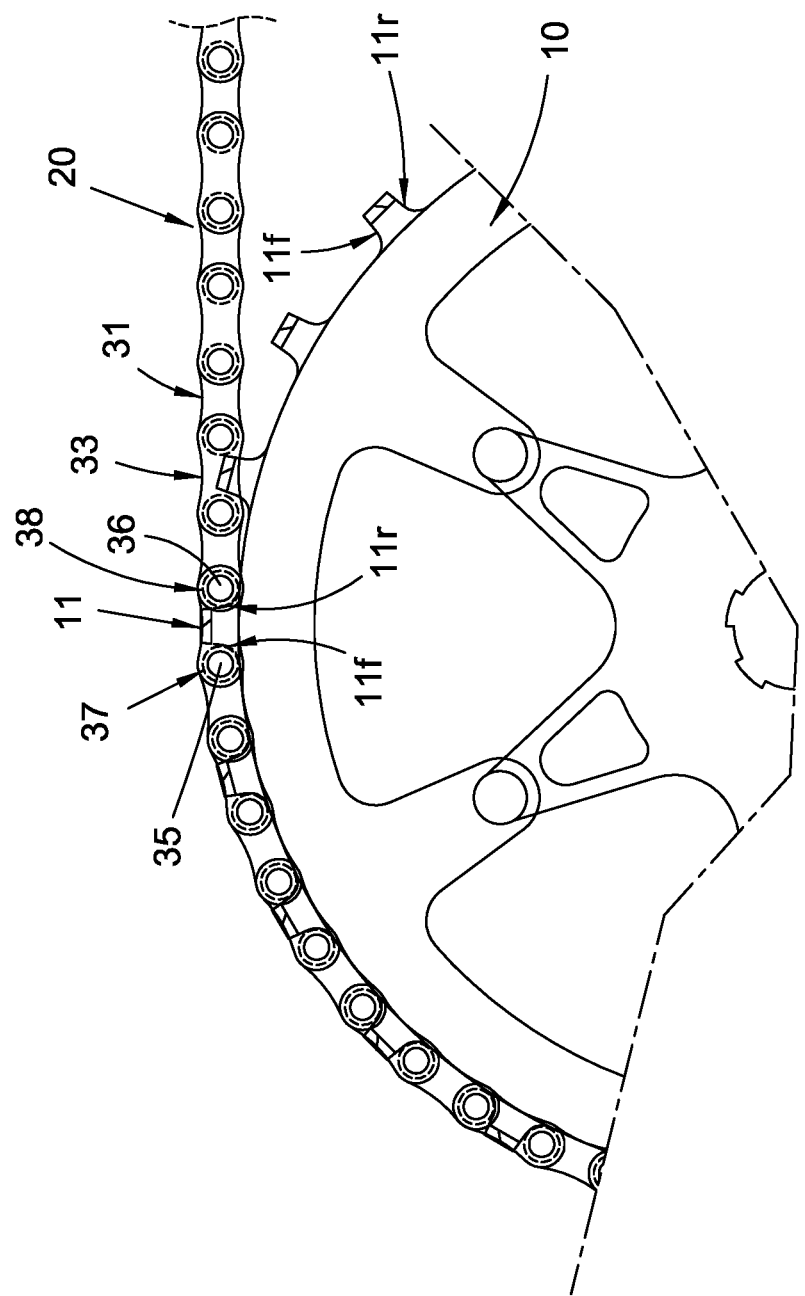
FIG. 5 is a schematic drawing showing a part of a bicycle sprocket engaged with some links of a bicycle chain of an embodiment according to the present invention.

The two outer layers of the multi-layer clad metal P are made of the second metal M2 while the intermediate layer of the multi-layer clad metal P is made of the first metal M1 and exposed on front and rear sides 11f, 11r of the tooth 11 of the bicycle sprocket 10 for being able to be in contact with the bushings 37, 38 of the link 30, as shown in FIG. 5.

Still refer to FIG. 3, an embodiment of the multi-layer clad metal P used to produce the inner plates 31, 32 and the outer plates 33, 34 is revealed. In this embodiment, the inner plates 31, 32 and the outer plates 33, 34 are produced by the multi-layer clad metal P2 with two layers. One of the two layers is made of the first metal M1 while the other layer is made of the second metal M2. An inner surface of both the inner plates 31, 32 and the outer plates 33, 34 (the surface on one side thereof facing the tooth 11 of the bicycle sprocket 10) is made of the first metal M1 with higher hardness so that wear resistance of both the inner plates 31, 32 and the outer plates 33, 34 is increased.

Figure 4:
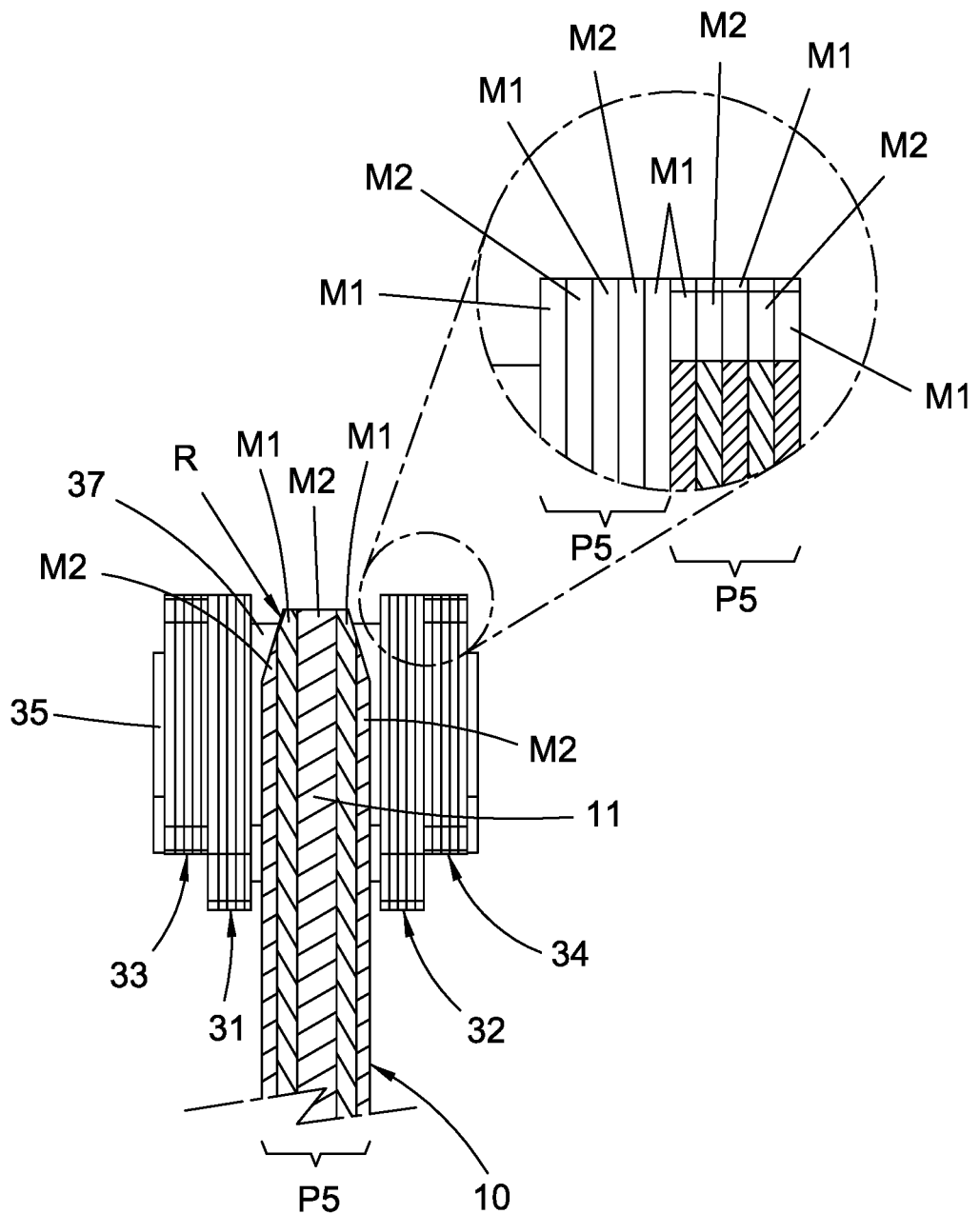
FIG. 4 is a schematic drawing a section of another embodiment according to the present invention.

Refer to FIG. 2 and FIG. 4, an embodiment of the multi-layer clad metal P used to produce the bicycle sprocket 10 is disclosed. In this embodiment, the bicycle sprocket 10 is made of the multi-layer clad metal having five layers P5 in which odd-numbered layers such as the first layer, the third layer and the fifth layer (the outermost layers and the intermediate layer) are made of the second metal M2 while even-numbered layers such as the second layer and the fourth layer are made of the first metal M1. Both the inner and outer sides 11s of the tooth 11 of the bicycle sprocket 10 are provided with a beveled edge R while the even-numbered layers made of the first metal M1 are exposed at the beveled edge R and in contact with the inner plates 31, 32 and the outer plates 33, 34. At the front and rear sides 11f, 11r of the tooth 11 of the bicycle sprocket 10, the even-numbered layers made of the first metal M1 are also exposed and in contact with the bushings 37, 38 of the link 30.

Still refer to FIG. 4, an embodiment of the multi-layer clad metal P used to produce the inner plates 31, 32 and the outer plates 33, 34 is revealed. The inner plates 31, 32 and the outer plates 33, 34 are made of the multi-layer clad metal P with at least three layers and the number of the layers is odd. In this embodiment, the inner plates 31, 32 and the outer plates 33, 34 are made of the multi-layer clad metal having five layers P5 in which the odd-numbered layers such as the first layer, the third layer and the fifth layer are made of the first metal M1 while the even-numbered layers such as the second layer and the fourth layer are made of the second metal M2.

Under the condition that the strength of both the bicycle sprocket 10 and the bicycle chain 20 meets the requirement, the thickness ratio of the layer made of the first metal M1 to the layer made of the second metal M2 in the multi-layer clad metal P can be adjusted according to users' needs. The contact parts of the bicycle sprocket 10 and the bicycle chain 20 in contact with each other are made of the multi-layer clad metal P which is composed of the first metal M1 and the second metal M2. Thus the weight of both the bicycle sprocket 10 and the bicycle chain 20 is significantly reduced. Therefore the lightweight design of the bicycle sprocket 10 and the bicycle chain 20 is achieved and the sufficient structural strength is assured.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A sprocket and chain assembly for bicycles comprising:
   a bicycle sprocket which is provided with a plurality of teeth; and
   a bicycle chain including a plurality of links joined to one another; the link having two inner plates, two outer plates, two pins and two bushings;
   wherein a contact part of the bicycle sprocket is in contact with a contact part of the outer plate and a contact part of the inner plate while the contact part of the bicycle sprocket, the contact part of the outer plate, and the contact part of the inner plate are made of a multi-layer clad metal which is composed of a first metal and a second metal; the first metal has higher hardness and density than the second metal; a surface material for the contact part of the bicycle sprocket, the contact part of the outer plate, and the contact part of the inner plate is the first metal with higher hardness.

2. The device as claimed in claim 1, wherein the first metal is stainless steel and the second metal is aluminum alloy.

3. The device as claimed in claim 2, wherein the first metal is 301 stainless steel and the second metal is 7075 aluminum alloy.

4. The device as claimed in claim 2, wherein the bicycle sprocket is made of the multi-layer clad metal having three layers; wherein two outer layers of the multi-layer clad metal are made of the second metal while an intermediate layer of the multi-layer clad metal is made of the first metal and exposed on front and rear sides of the tooth of the bicycle sprocket for being able to be in contact with the bushings of the link.

5. The device as claimed in claim 3, wherein the bicycle sprocket is made of the multi-layer clad metal having three layers; wherein two outer layers of the multi-layer clad metal are made of the second metal while an intermediate layer of the multi-layer clad metal is made of the first metal and exposed on front and rear sides of the tooth of the bicycle sprocket for being able to be in contact with the bushings of the link.

6. The device as claimed in claim 2, wherein the bicycle sprocket is made of the multi-layer clad metal having five layers in which odd-numbered layers, including a first layer, a third layer, and a fifth layer, are made of the second metal while even-numbered layers, including a second layer and a fourth layer, are made of the first metal; both inner and outer sides of the tooth of the bicycle sprocket are provided with a beveled edge; the even-numbered layers made of the first metal are exposed at the beveled edge and able to be in contact with the inner plates and the outer plates; the even-numbered layers made of the first metal are also exposed at front and rear sides of the tooth of the bicycle sprocket and able to be in contact with the bushings of the link.

7. The device as claimed in claim 3, wherein the bicycle sprocket is made of the multi-layer clad metal having five layers in which odd-numbered layers, including a first layer, a third layer, and a fifth layer, are made of the second metal while even-numbered layers, including a second layer and a fourth layer, are made of the first metal; both inner and outer sides of the tooth of the bicycle sprocket are provided with a beveled edge; the even-numbered layers made of the first metal are exposed at the beveled edge and able to be in contact with the inner plates and the outer plates; the even-numbered layers made of the first metal are also exposed at front and rear sides of the tooth of the bicycle sprocket and able to be in contact with the bushings of the link.

8. The device as claimed in claim 2, wherein the inner plates and the outer plates are produced by the multi-layer clad metal with two layers; one of the two layers is made of the first metal while the other layer is made of the second metal; an inner surface of both the inner plates and the outer plates is made of the first metal with higher hardness.

9. The device as claimed in claim 3, wherein the inner plates and the outer plates are produced by the multi-layer clad metal with two layers; one of the two layers is made of the first metal while the other layer is made of the second metal; an inner surface of both the inner plates and the outer plates is made of the first metal with higher hardness.

10. The device as claimed in claim 2, wherein the inner plates and the outer plates are made of the multi-layer clad metal with at least three layers and the number of the layers is odd; odd-numbered layers of the multi-layer clad metal are made of the first metal while even-numbered layers of the multi-layer clad metal are made of the second metal.

11. The device as claimed in claim 3, wherein the inner plates and the outer plates are made of the multi-layer clad metal with at least three layers and the number of the layers is odd; odd-numbered layers of the multi-layer clad metal are made of the first metal while even-numbered layers of the multi-layer clad metal are made of the second metal.

* * * * *